(12) United States Patent
Fujimoto et al.

(10) Patent No.: US 6,887,623 B2
(45) Date of Patent: May 3, 2005

(54) ELECTRODE FOR RECHARGEABLE LITHIUM BATTERY AND RECHARGEABLE LITHIUM BATTERY

(75) Inventors: Hiroyuki Fujimoto, Kobe (JP); Hiroko Sanda, Kobe (JP); Takashi Okamoto, Gunma (JP); Toyoki Fujihara, Kobe (JP); Masahiro Iyori, Hirakata (JP); Maruo Kamino, Kobe (JP); Shigeki Matsuta, Kobe (JP)

(73) Assignee: Sanyo Electric Co., Ltd., Osaka (JP)

( * ) Notice: Subject to any disclaimer, the term of this patent is extended or adjusted under 35 U.S.C. 154(b) by 413 days.

(21) Appl. No.: 10/118,309

(22) Filed: Apr. 9, 2002

(65) Prior Publication Data

US 2004/0224231 A1 Nov. 11, 2004

(30) Foreign Application Priority Data

Apr. 9, 2001 (JP) ........................................ 2001-110149
Apr. 19, 2001 (JP) ........................................ 2001-121172

(51) Int. Cl.[7] .............................................. H01M 4/62
(52) U.S. Cl. ........................ 429/232; 429/233; 429/236
(58) Field of Search ................................ 429/232, 233, 429/236, 142, 148, 163

(56) References Cited

U.S. PATENT DOCUMENTS 5,582,935 A * 12/1996 Dasgupta et al. ......... 429/218.1
2004/0048161 A1 * 3/2004 Sunagawa et al. ........ 429/231.5

FOREIGN PATENT DOCUMENTS

| JP | 10-255768 A | 9/1998 |
| WO | 01/31720 A1 | 5/2001 |

OTHER PUBLICATIONS

Huggins, R. A.; "Lithium Alloy Negative Electrodes Formed from Convertible Oxides"; *Solid State Ionics;* vol. 113–115, pp. 57–67; 1998.

* cited by examiner

*Primary Examiner*—Dah-Wei Yuan
(74) *Attorney, Agent, or Firm*—Kubovcik & Kubovcik

(57) ABSTRACT

An electrode for a rechargeable lithium battery which includes a current collector and a thin film composed of active material that stores and releases lithium and deposited on the current collector, the electrode being characterized in that the current collector has irregularities on its surface and the thin film has spaces extending in a thickness direction of the thin film and configured to increase their width dimensions toward valleys of the irregularities on the current collector surface.

19 Claims, 3 Drawing Sheets

ELECTRODE FOR RECHARGEABLE LITHIUM BATTERY AND RECHARGEABLE LITHIUM BATTERY

This application claims priority under 35 U.S.C. §119 of Japanese Patent Application No. 2001-110149 filed Apr. 9, 2001, and Japanese Patent Application No. 2001-121172 filed Apr. 19, 2001.

BACKGROUND OF THE INVENTION

1. Field of the Invention

The present invention relates to an electrode for a rechargeable lithium battery and a rechargeable lithium battery utilizing the same.

2. Description of Related Art

Battery characteristics of rechargeable lithium batteries recently under extensive development and research, such as charge-discharge voltage, charge-discharge cycle life characteristics and storage characteristics, depend largely upon the types of the electrodes used. This has led to the various attempts to better battery characteristics by improving electrode active materials.

The use of lithium metal as the negative active material enables construction of batteries which exhibit high energy densities per weight and volume. However, the lithium deposited on charge grows into dendrite, which could cause problematic internal short-circuiting.

On the other hand, rechargeable lithium batteries are reported using an electrode composed of aluminum, silicon, tin or the like which alloys electrochemically with lithium during charge (Solid State Ionics, 113–115, p57(1998)). Particularly among these, silicon has a high theoretical capacity and is a promising one as a high-capacity negative electrode for a battery. Accordingly, various rechargeable batteries have been proposed using this as a negative electrode (Japanese Patent Laid-Open No. Hei 10-255768). However, the negative electrodes composed of these types of alloys have failed to provide sufficient cycle characteristics since such alloys as electrode active materials are pulverized during charge and discharge to reduce their current collecting capabilities.

As an electrode for a rechargeable lithium battery which uses silicon or the like for an electrode active material and exhibits good charge-discharge cycle characteristics, an electrode has been proposed incorporating a microcrystalline or noncrystalline thin film deposited on a current collector by a thin-film forming technique such as a CVD or sputtering process (International Publication No. WO 01/31720A1).

In such an electrode for a rechargeable lithium battery, it has been found that the diffusion of a component of the current collector into the thin film of active material maintains good adhesion between the current collector and the thin film of active material to thereby improve charge-discharge cycle characteristics.

However, due to the improved adhesion between the current collector and the thin film of active material, the current collector elongates as the active material expands and shrinks during charge and discharge. This occasionally results in the occurrence of deformation, such as wrinkle formation in the electrode for a rechargeable lithium battery. The degree of deformation becomes greater particularly when a high-ductility metal foil such as a copper foil is used as the current collector. As the electrode undergoes deformation, its volume in the battery increases to problematically reduce an energy density per volume of the battery.

SUMMARY OF THE INVENTION

It is an object of the present invention to provide an electrode for a rechargeable lithium battery, which has a high charge-discharge capacity, exhibits improved charge-discharge cycle characteristics and is little susceptible to deformation, such as wrinkle, and also provide a rechargeable lithium battery using the same.

The electrode for a rechargeable lithium battery, in accordance with the present invention, has a thin film composed of active material that stores and releases lithium and deposited on a current collector. Characteristically, the current collector has irregularities on its surface, and the thin film has spaces which extend in a thickness direction of the thin film and are configured to increase their width dimensions toward valleys of the irregularities defined on a surface of the current collector.

In the electrode for a rechargeable lithium battery, in accordance with the present invention, the thin film of active material has spaces which extend in its thickness direction and are configured to increase their width dimensions toward valleys of the irregularities defined on a surface of the current collector. These spaces may be either opened or closed at the top of the thin film. In the present invention, since the spaces are configured to become wider toward valleys of the irregularities defined on the current collector surface, the wider spaces are defined in the vicinity of the current collector surface. Accordingly, when the thin film expands and shrinks in volume as it stores and releases lithium during a charge-discharge reaction, these spaces absorb the change in volume of the active material in the vicinity of the current collector surface. This suppresses a magnitude of a stress imposed on the current collector during expansion and shrinkage in volume of the active material. As a result, the current collector becomes less susceptible to deformation, such as wrinkling, during charge and discharge.

The above-described spaces serve to relax a stress which results from expansion and shrinkage in volume of the active material during charge and discharge. It is accordingly preferred that these spaces are formed in advance in the thin film before it is subjected to charge and discharge. Preferably, these spaces are defined during deposition of the thin film.

Although the width dimensions of the spaces vary with the magnitude or the like of the irregularities on the current collector surface, a maximum width dimension is preferably up to 10 μm.

Since the spaces are defined over the valleys of the irregularities of the current collector surface, they are generally defined such that they are connected with each other along the valleys of the current collector surface. Since the valleys of the irregularities on the current collector surface are generally arranged to connect with each other like a network on the current collector surface, those spaces are generally defined to connect with each other like a network along the valleys of the irregularities on the current collector surface.

The thin film of active material with such spaces can be obtained, for example, by depositing metal particles on a surface-roughened metal foil to provide a metal foil as a current collector and subsequently depositing the thin film on the metal foil. Preferably, the metal particles are deposited on projections of the irregularities defined on the surface-roughened metal foil. The deposition of the metal particles on the projections eases formation of spaces below the deposited metal particles.

One preferred method of depositing metal particles is an electrolytic deposition process in which metal particles are electrolytically deposited from a solution of its ions. The use of such an electrolytic deposition process enables the deposited metal particles to firmly adhere to a metal foil and results in the even distribution of the deposited metal particles in a planar direction. However, the deposition of the metal particles is not considered as limited to this electrolytic deposition process. Other methods can also be utilized to deposit the metal particles.

A surface roughness Ra of the surface-roughened metal foil is preferably within the range of 0.01–2 µm. After deposition of the metal particles, the metal foil preferably has a surface roughness Ra within the range of 0.2–2.2 µm. The surface roughness Ra is defined in Japan Industrial Standards (JIS B 0601-1994) and can be determined by a surface roughness meter.

The material for use as active material in the present invention is not particularly specified, so long as it has the ability to store and release lithium. The material which stores lithium by being alloyed with lithium is preferably used. Examples of such materials include silicon, germanium, tin, lead, zinc, magnesium, sodium, aluminum, potassium, indium and alloys thereof. The use of silicon, among these materials, is particularly preferred for its high theoretical capacity. Silicon in the noncrystalline or microcrystalline form is preferably used.

In the present invention, various methods can be utilized to deposit the thin film of active material. One preferred method involves allowing atoms or ions to move from a vapor or liquid phase toward the current collector substrate and deposit thereon. Examples of specific methods include CVD, sputtering, vapor evaporation, spraying and plating processes.

The current collector for use in the present invention is preferably formed of a metal that does not alloy with lithium. Examples of such metals include copper, copper-containing alloys, nickel and stainless steel.

In the case where a metal foil incorporating metal particles deposited on its rough surface is used, such a metal foil is preferably made of copper, copper-containing alloys, nickel, stainless steel or the like. Examples of copper-containing alloys include phosphor bronze, red copper, Cu—Ni—Si alloys and Cu—Cr—Zr alloys. Other metals and alloys can also be used which are stable at such a poor electron potential that permits active material, e.g., silicon, to store and release lithium.

It is also preferred that the metal particles to be deposited on the metal foil are stable at a poor electron potential. In view of such stability and ability to deposit with an electrolytic deposition process, the metal particles are preferably made of copper.

It is particularly preferred that the metal foil is formed of copper or its alloy. The preferred copper alloys are Cu—Ni—Si alloys and Cu—Cr—Zr alloys. The use of these alloys further reduces the occurrence of wrinkling or other type of deformation. It is also preferred that the copper alloy metal foil has a surface roughness Ra in the range of 0.01–1 µm.

Illustrative of Cu—Ni—Si alloys is a Corson alloy. The Corson alloy is an age-hardening alloy containing an $Ni_2Si$ phase as its precipitation phase and is regarded as a Cu—$Ni_2Si$ pseudobinary system. The Corson alloy has high tensile strength, proportional limit and elastic coefficient. Examples of Corson alloys are Cu—Ni—Si alloys which contain 1.0–4.0% by weight of Ni and 0.1–1.0% by weight of Si. These alloys may further contain 0.05–0.3% by weight of Mg, 0.05–5.0% by weight of Zn, up to 5.0% by weight of Sn and less than 0.1% by weight of P, if necessary.

Illustrative Cu—Cr—Zr alloys contain 0.05–0.5% by weight of Cr and 0.01–0.3% by weight of Zr. These alloys may further contain 0.01–0.3% by weight of Mg, 0.05–5.0% by weight of Zn, up to 5.0% by weight of Sn and less than 0.1% by weight of P, if necessary.

The metal foil, if made of a copper alloy, preferably has a tensile strength of 400 $N/mm^2$ or higher, a proportional limit of 160 $N/mm^2$ or higher and an elastic coefficient of 1.1 $N/mm^2$ or higher. More preferably, it has a tensile strength of 480 $N/mm^2$ or higher, a proportional limit of 162 $N/mm^2$ or higher and an elastic coefficient of 1.15 $N/mm^2$ or higher.

The tensile strength, proportional limit and elastic coefficient can be determined, for example, by using an Instron 5566 universal testing machine from Instron Corporation.

Also, the metal foil is preferably roughened by such a technique as plating, vapor growth, etching or polishing to provide a rough surface on which the thin film is to be deposited.

In the present invention, a component of the current collector is preferably diffused into the thin film of active material. In an exemplary case where a silicon thin film serves as the thin film of active material and the current collector contains copper, it is preferred that copper is diffused into the silicon thin film. Application of heat promotes diffusion of such a current collector component. Accordingly, a higher substrate temperature during deposition of the thin film or a heat treatment after deposition of the thin film results in the increased diffusion of the current collector component.

Where the active material is silicon or the like, it is preferred that the current collector component when diffused into the thin film forms a solid solution, instead of an intermetallic compound, with a component of the thin film. In the case where the thin film component is silicon and the current collector component is copper, it is preferred that silicon and copper form a solid solution, instead of an intermetallic compound, in the thin film. Generally, the excessive diffusion of the current collector component results in the increased formation of an intermetallic compound. For example, a high-temperature heat treatment after deposition of the thin film occasionally results in the formation of an intermetallic compound. The intermetallic compound, as used herein, refers to a compound which has a specific crystal structure formed via combination of metals at specific proportions.

The diffusion of the current collector component into the thin film of active material improves adhesion of the thin film to the current collector and accordingly improves charge-discharge cycle characteristics.

In the present invention, the thin film of active material may be divided into columns by gaps formed therein, via a charge-discharge reaction, in a manner to extend in its thickness direction. The thin film of active material in the present invention already has spaces defined in a manner to increase their width dimensions toward the valleys of the irregularities on the current collector surface. In the case where some spaces are closed at the top of the thin film, the closed portions may be opened by the gaps formed therein by the charge-discharge reaction, so that the thin film is divided into columns. Such spaces now opened accommodate expansion and shrinkage in volume of the thin film of active material during the charge-discharge reaction in a more satisfactory manner. As a result, the resulting stress can be relaxed throughout the thin film of active material. This further prevents the thin film of active material from separating from the current collector and maintains good adhesion of the thin film to the current collector.

The thin film in the present invention may be made up of a sequence of superimposed layers. These layers may differ from each other in terms of composition, crystallinity, impurity or element concentration or the like. Such layers may provide a thin film structure graded in its thickness direction. For example, such layers, if properly arranged, can provide a thin film structure wherein the composition, crystallinity, impurity or element concentration or the like is varied in its thickness direction.

Lithium may be previously stored in or added to the thin film in the present invention. Lithium may be added during deposition of the thin film. That is, a lithium-containing active material may be deposited to introduce lithium in the resulting thin film. Alternatively, lithium may be added or stored after deposition of the thin film. One possible method is to use an electrochemical mechanism whereby lithium is stored in or added to the thin film.

The thickness of the thin film in the present invention is not particularly specified. It may be up to 20 μm, for example. Preferably, it does not fall below 1 μm to ensure a high charge-discharge capacity.

The rechargeable lithium battery of the present invention is characterized as including a negative electrode comprised of the above-described electrode of the present invention, a positive electrode and a nonaqueous electrolyte.

An electrolyte solvent for use in the rechargeable lithium battery of the present invention is not particularly specified in type but can be illustrated by a mixed solvent which contains cyclic carbonate such as ethylene carbonate, propylene carbonate, butylene carbonate or vinylene carbonate and also contains chain carbonate such as dimethyl carbonate, methyl ethyl carbonate or diethyl carbonate. Also applicable is a mixed solvent of the above-listed cyclic carbonate with an ether solvent such as 1,2-dimethoxyethane or 1,2-diethoxyethane or with a chain ester such as γ-butyrolactone, sulfolane or methyl acetate. Examples of electrolyte solutes include $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiClO_4$, $Li_2B_{10}Cl_{10}$, $Li_2B_{12}Cl_2$ and mixtures thereof. Other applicable electrolytes include gelled polymer electrolytes comprised of an electrolyte solution impregnated into polymer electrolytes such as polyethylene oxide, polyacrylonitrile and polyvinylidene fluoride; and inorganic solid electrolytes such as LiI and $Li_3N$, for example. The electrolyte for the rechargeable lithium battery of the present invention can be used without limitation, so long as an Li compound as its solute that imparts an ionic conductivity, together with its solvent that dissolves and retains the Li compound, remain undecomposed at voltages during charge, discharge and storage of the battery.

Examples of useful active materials for the positive electrode of the rechargeable lithium battery of the present invention include lithium-containing transition metal oxides such as $LiCoO_2$, $LiNiO_2$, $LiMn_2O_4$, $LiMnO_2$, $LiCo_{0.5}Ni_{0.5}O_2$ and $LiNi_{0.7}Co_{0.2}Mn_{0.1}O_2$; and lithium-free metal oxides such as $MnO_2$. Other substances can also be used, without limitation, if they are capable of electrochemical lithium insertion and deinsertion.

DESCRIPTION OF THE PREFERRED EXAMPLES

The present invention is now described in more detail with reference to examples. It will be recognized that the following examples merely illustrate the practice of the present invention but are not intended to be limiting thereof. Suitable changes and modifications can be effected without departing from the scope of the present invention.

Experiment 1

(Preparation of Current Collector Substrates)

Three different types of substrates a, b and c were prepared.

The substrate a was prepared by depositing copper particles on an electrolytic copper foil (surface roughness Ra=0.72 μm) by an electrolytic deposition process. The electrolytic copper foil was fabricated by an electrolytic process. Electrolytic deposition of the copper particles was achieved by using the electrolytic copper foil as a cathode and effecting electrolysis at a current density of 3 A/dm² in a copper sulfate plating bath.

The substrate b was prepared by depositing copper particles on a rolled copper foil (surface roughness Ra=0.07 μm) by an electrolytic deposition process, as similar to the case of the substrate a.

The substrate c was an electrolytic copper foil having the same surface profile and surface roughness as that used in the preparation of the substrate a.

The surface roughness Ra, surface roughness Ry, thickness measured with a micrometer, and tensile strength, for each of the substrates a–c, are listed in Table 1.

TABLE 1

|  | Substrate a (Ex. 1) | Substrate b (Comp. Ex. 1) | Substrate c (Comp. Ex. 2) |
| --- | --- | --- | --- |
| Surface Roughness Ra (μm) | 1.11 | 0.50 | 0.72 |
| Surface Roughness Ry (μm) | 5.99 | 3.04 | 4.10 |
| Thichkness (μm) | 26 | 26 | 21 |
| Tensile Strength (N/mm²) | 190–200 | 270–290 | 220–230 |

Figure 5:
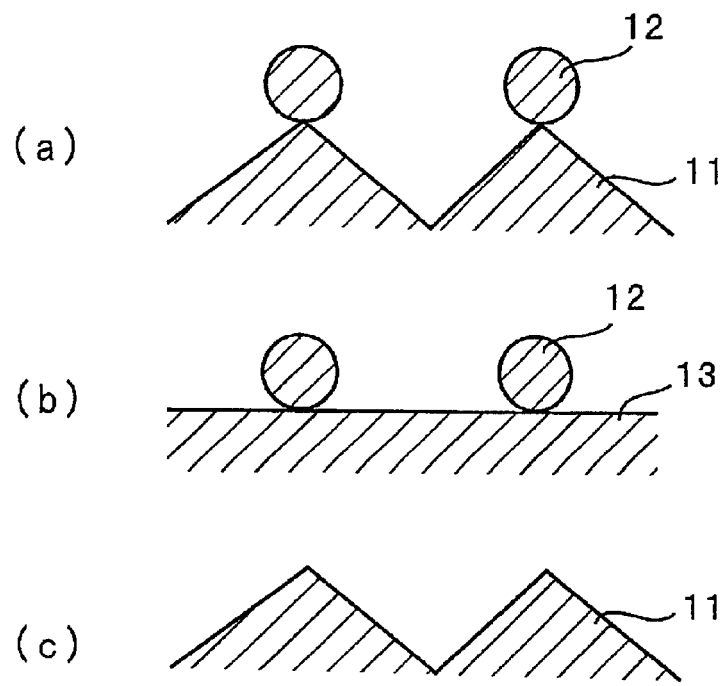
FIG. 5 shows diagrammatic sectional views illustrating configurations of the current collector substrates prepared in Example 1 and Comparative Examples 1 and 2.

FIG. 5 shows schematic sectional views of the substrates a–c. FIGS. 5(a), 5(b) and 5(c) illustrate the substrates a, b and c, respectively.

As shown in FIG. 5(a), in the substrate a, copper particles 12 are deposited on projections of irregularities defined on a surface of an electrolytic copper foil 11. This is considered due likely to the concentrated electrolysis at the projections of the copper foil surface where copper deposits into the copper particles 12.

As shown in FIG. 5(b), in the substrate b, the copper particles 12 are deposited to locate on a surface of the rolled copper foil 13 having a relatively smooth surface.

The substrate c is the electrolytic copper foil 11 having irregularities on its surface, as shown in FIG. 5(c). The projections of the irregularities defined on a surface of the electrolytic copper foil 11 have a substantially conical configuration.

(Fabrication of Electrodes)

A silicon thin film was deposited on a rough surface of each of the above-prepared three different types of substrates a–c by an RF sputtering technique to fabricate electrodes.

The sputtering was achieved at a sputter gas (argon gas) flow rate of 100 sccm, an ambient substrate temperature (not heated), a reaction pressure of $1.0 \times 10^{-3}$ Torr and 350 W RF power. Silicon was deposited to a thickness of about 5 $\mu$m.

The resulting silicon thin film was analyzed by Raman spectroscopy which revealed the presence of a peak around 480 cm$^{-1}$ and the absence of a peak around 520 cm$^{-1}$. This analysis proved an amorphous nature of the silicon thin film.

The electrode having a silicon thin film deposited on the substrate a, b or c was designated as an electrode of Example 1, Comparative Example 1 or Comparative Example 2.

Figure 1:
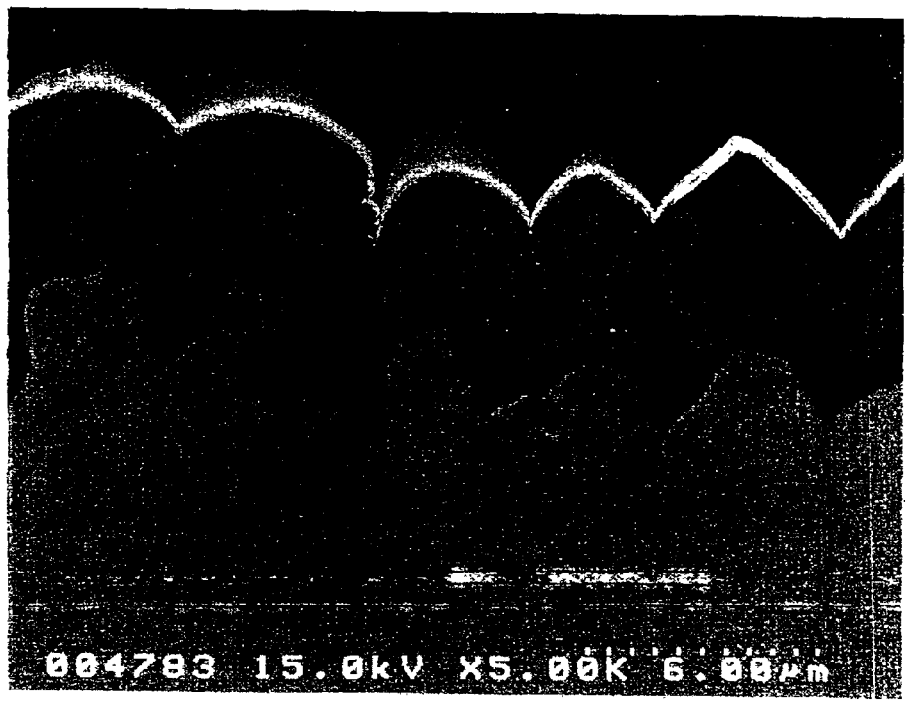
FIG. 1 is a photomicrograph (at a magnification of 5,000×) taken using a scanning electron microscope, showing a section of the electrode for a rechargeable lithium battery as constructed in Example 1 in accordance with the present invention.
Figure 2:
FIG. 2 is a photomicrograph (at a magnification of 5,000×) taken using a scanning electron microscope, showing a section of the electrode for a rechargeable lithium battery as constructed in Comparative Example 1.
Figure 3:
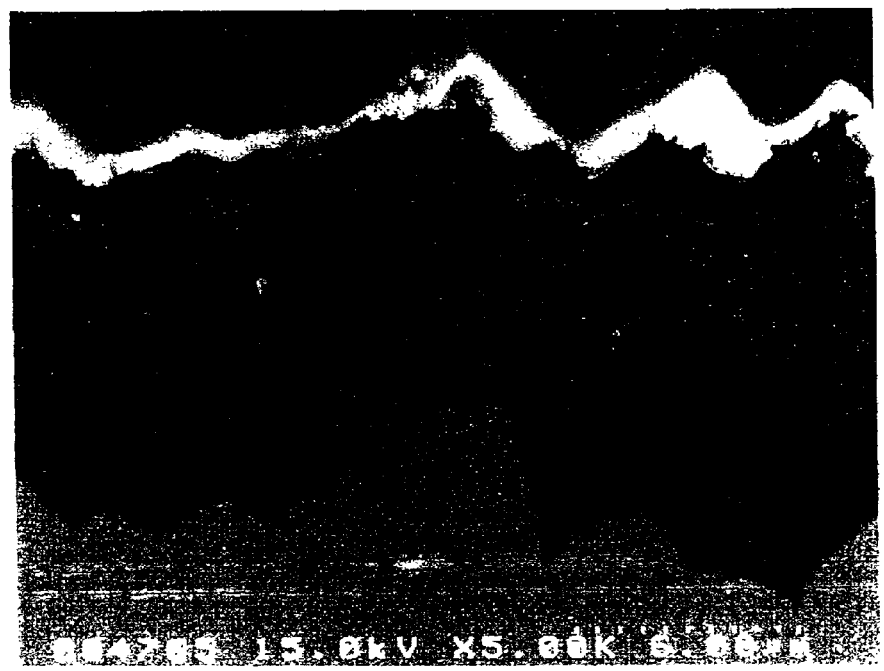
FIG. 3 is a photomicrograph (at a magnification of 5,000×) taken using a scanning electron microscope, showing a section of the electrode for a rechargeable lithium battery as constructed in Comparative Example 2.

The electrodes of Example 1 and Comparative Examples 1 and 2 were observed using a scanning electron microscope. FIGS. 1–3 are photomicrographs taken using a scanning electron microscope, showing the electrodes of Example 1, Comparative Example 1 and Comparative Example 2, respectively. Each photomicrograph was taken at a magnification of 5,000×.

In FIGS. 1–3, a lower portion that appears light indicates the copper foil. The silicon thin film is found as a relatively dark portion on the copper foil. A portion that overlies the silicon thin film is a resin embedding a sample.

As clearly seen from FIG. 1, irregularities are defined on a surface of the copper foil substrate and projections have a round top. This is due to the presence of copper particles deposited on distal ends of the projections.

Figure 4:
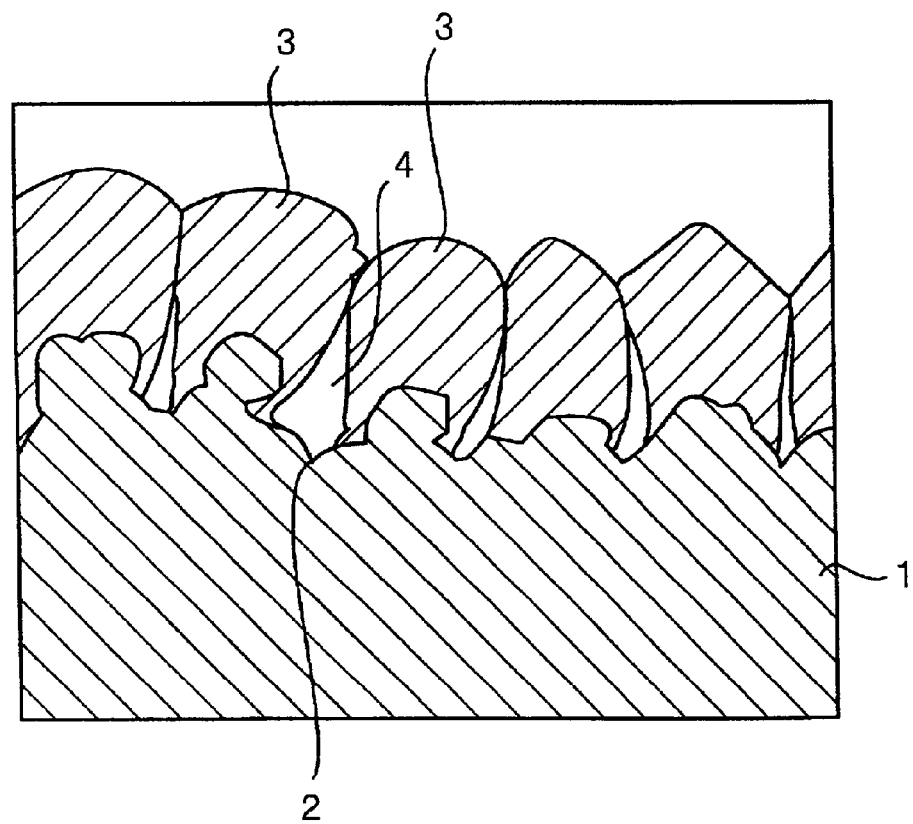
FIG. 4 is a diagrammatic sectional representation of the photomicrograph shown in FIG. 1.

FIG. 4 is a sectional view which diagrammatically represents the photomicrograph shown in FIG. 1. As shown in FIG. 4, irregularities are defined on a surface of the copper foil 1 which serves as a current collector. Since the silicon thin film 3 is deposited on such irregularities, it also has irregularities which conform to a surface profile of the current collector 1. Also, the spaces 4 are defined over the valleys 2 of the irregularities defined on the current collector 1. These spaces 4 shown in FIG. 4 are found as dark portions in FIG. 1. Such spaces 4 are configured to have larger width dimensions toward the respective valley 2. In other words, the spaces 4 are configured to have smaller width dimensions toward a top surface of the silicon thin film 3. There are observed some locations where the spaces 4 decrease their width dimensions as they extend upwardly and are finally closed by neighboring portions of the silicon thin film 3. In other locations, the spaces 4 are observed to be opened to an upper external.

In the electrode of Comparative Example 1 as shown in FIG. 2, copper particles are deposited in such a manner to define small irregularities on a surface of the current collector. The silicon thin film is deposited thereon in a manner to follow such irregularities. The silicon thin film has on its surface irregularities which are not so small as those defined on the current collector, i.e., in the form of large undulations. Such large spaces as defined in the silicon thin film and shown in FIG. 1 are not observed in the electrode of Comparative Example 1 shown in FIG. 2.

As shown in FIG. 3, in the electrode of Comparative Example 2, the silicon thin film is deposited in a manner to run along the irregularities on a surface of the electrolytic copper foil. The silicon thin film thus has on its surface the irregularities which correspond in profile to those defined on the surface of the electrolytic copper foil. Such large spaces as defined in the silicon thin film and shown in FIG. 1 are not observed in the silicon thin film shown in FIG. 3.

Each of the electrodes of Example 1 and Comparative Examples 1 and 2 was cut into a 2 cm×2 cm size. After attachment of a nickel lead wire, each electrode was dried under vacuum at 110° C. for 2 hours to fabricate a working electrode for use in a beaker cell.

(Preparation of Electrolyte Solution)

1 mole/liter of LiPF$_6$ was dissolved in a mixed solvent containing ethylene carbonate and diethyl carbonate at a 3:7 ratio by volume to prepare an electrolyte solution.

(Construction of Beaker Cell)

Figure 6:
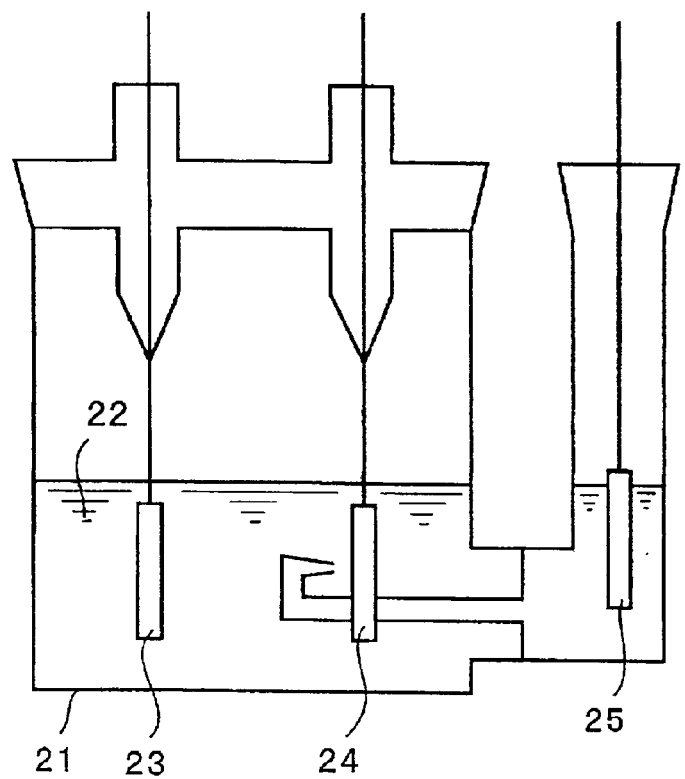
FIG. 6 is a schematic view illustrating a beaker cell constructed in Example 1 in accordance with the present invention.

Using each of the above-fabricated working electrodes of Example 1 and Comparative Examples 1 and 2, a three electrode beaker cell as shown in FIG. 6 was constructed. As shown in FIG. 6, the beaker cell includes a counter electrode 23, a working electrode 24 and a reference electrode 25, which are all immersed in an electrolyte solution 22 contained in a container 21. The above-prepared electrolyte solution was used as the electrolyte solution 22. Lithium metal was used for both the counter electrode 23 and the reference electrode 25.

(Evaluation of Charge-Discharge Characteristics)

The above-constructed beaker cell was charged at a constant current of 4 mA until a potential of the working electrode dropped to 0 V (vs. Li/Li$^+$) and then discharged at a constant current of 4 mA until the working electrode potential increased to 2 V (vs. Li/Li$^+$) to evaluate a discharge capacity per unit area and an initial-cycle charge-discharge efficiency. In this beaker cell, reduction of the working electrode is regarded as charge and oxidation thereof is regarded as discharge.

The initial-cycle charge-discharge efficiency is calculated from the following equation:

(Initial charge-discharge efficiency)=(Initial discharge capacity)÷(Initial charge capacity)×100

The initial discharge capacities and initial charge-discharge efficiencies for beaker cells using the electrodes of Example 1 and Comparative Examples 1 and 2 are listed in Table 2.

TABLE 2

|  | Initial Discharge Capacity (mAh/cm$^2$) | Initial Charge-Discharge Efficiency (%) |
| --- | --- | --- |
| Ex. 1 | 3.89 | 94.8 |
| Comp. Ex. 1 | 3.36 | 94.1 |
| Comp. Ex. 2 | 3.74 | 94.7 |

As apparent from Table 2, the beaker cell using the electrode of Example 1 provides a high initial discharge capacity and a satisfactory initial charge-discharge efficiency in a manner similar to those using the electrodes of Comparative Examples 1 and 2.

(Evaluation of Electrode Thickness)

The thickness of each electrode after the above charge-discharge test was measured using a micrometer. The thickness was measured at a center and four edges of the electrode, i.e., at five points in all, by a micrometer. An arithmetic mean of the values obtained was recorded as the thickness of the electrode after the charge-discharge test. The measurement results are given in Table 3.

TABLE 3

| | Thickness After Charge-Discharge Test ($\mu$m) |
|---|---|
| Ex. 1 | 39 |
| Comp. Ex. 1 | 201 |
| Comp. Ex. 2 | 162 |

As apparent from Table 3, the electrode of Example 1 after the charge-discharge test gives a much lower thickness value than the electrodes of Comparative Examples 1 and 2. The electrodes of Comparative Examples 1 and 2 are considered to have increased their thicknesses as a result of deformation such as wrinkles formed therein during charge and discharge. In contrast, the electrode of Examples 1 showed little increase in thickness after the charge-discharge test, probably because its current collector was little susceptible to deformation, such as wrinkling, during charge and discharge.

In the electrodes of Comparative Examples 1 and 2, a number of wrinkles was actually observed in the current collector, even when viewed with an naked eye. On the other hand, appreciable wrinkling or other type of deformation was not observed in the electrode of Example 1.

The foregoing is believed to demonstrate the following. That is, the electrode of Example 1 has the spaces defined in the vicinity of valleys of the irregularities on a surface of the current collector, as shown in FIGS. 1 and 4. The presence of these spaces permits the electrode to accommodate a change in volume of the active material as it expands and shrinks during charge and discharge. This prevents a stress produced when the active material expands and shrinks from being imposed on the current collector, so that wrinkling or other type of deformation is not caused to occur in the current collector.

Accordingly, the use of the electrode for a rechargeable lithium battery, in accordance with the present invention, prevents the occurrence of wrinkling or other type of deformation during charge and discharge.

(Construction of Rechargeable Lithium Batteries)

A rechargeable lithium battery was constructed using the above electrode of Example 1 for its negative electrode and lithium cobaltate (LiCoO$_2$) for its positive electrode. Each electrode had an area of 2 cm×2 cm. The electrolyte solution prepared by dissolving 1 mole/liter of LiPF$_6$ in a mixed solvent containing an equivolume of ethylene carbonate and diethyl carbonate was used.

The battery was charged to 4.2 V and then discharged to 2.75 V, each at a constant current of 2.8 mA. This cycle resulted in obtaining a discharge capacity of about 13 mAh at an average voltage of 3.45 V. Also, no appreciable wrinkling or other type of deformation was observed in the negative electrode of this rechargeable lithium battery.

Experiment 2

A Corson alloy foil was chemically etched at its surface to prepare a substrate having a rough surface. The thickness, tensile strength, proportional limit, elastic coefficient and surface roughness Ra of this substrate are listed in Table 4. The thickness is given by a value measured by a micrometer. The tensile strength, proportional limit and elastic coefficient are given by values determined using an Instron 5566 universal testing machine from Instron Corporation. The surface roughness Ra is given by a value measured by a surface roughness meter.

TABLE 4

| Substrate | Thickness ($\mu$m) | Tensile Strength (N/mm$^2$) | Proportional Limit (N/mm$^2$) | Elastic Coefficient (×10$^5$ N/mm$^2$) | Surface Roughness Ra ($\mu$m) |
|---|---|---|---|---|---|
| Corson Alloy | 19.5 | 630 | 195 | 1.4 | 0.20 |

The procedure of Experiment 1 was followed to deposit copper particles on this substrate, instead of the substrate a, by an electrolytic deposition process. After deposition of the copper particles, the substrate was found to have a surface roughness Ra of 0.72 $\mu$m and a thickness of 23.2 $\mu$m. This substrate was used as a current collector and a silicon thin film was deposited on the current collector, as analogous to Experiment 1, to fabricate an electrode.

As similar to Experiment 1, a beaker cell was constructed using the above-fabricated electrode and then evaluated for charge-discharge characteristics. Evaluation results are listed in Table 5.

A thickness of the electrode after the charge-discharge test was determined in the same manner as in Experiment 1. The increase in thickness of the electrode after the charge-discharge test is indicated in Table 5.

TABLE 5

| Initial Discharge Capacity (mAh/cm$^2$) | Initial Charge-Discharge Efficiency (%) | Thickness Increase After Charge-Discharge Test ($\mu$m) |
|---|---|---|
| 3.74 | 95.2 | 11.3 |

As demonstrated in Table 5, the use of the Corson alloy foil as a metal foil also resulted in not only obtaining a high initial charge-discharge efficiency but also suppressing the increase in thickness of the electrode after the charge-discharge test in a remarkable manner.

In accordance with the present invention, an electrode for a rechargeable lithium battery can be provided which has a high charge-discharge capacity, shows improved charge-discharge cycle characteristics, and is less susceptible to deformation such as wrinkling during charge and discharge. As a result, a possible reduction of volumetric energy density due to electrode deformation is effectively suppressed.

What is claimed is:

1. An electrode for a rechargeable lithium battery which includes a current collector and a thin film composed of active material that stores and releases lithium and deposited on the current collector, wherein said current collector has irregularities on its surface and said thin film has spaces extending in a thickness direction of the thin film and configured to increase their width dimensions toward valleys of the irregularities on the current collector surface.

2. The electrode for a rechargeable lithium battery as recited in claim 1, wherein said spaces are defined during deposition of said thin film.

3. The electrode for a rechargeable lithium battery as recited in claim 1, wherein said spaces have a maximum width dimension of up to 10 $\mu$m.

4. The electrode for a rechargeable lithium battery as recited in claim 1, wherein said spaces are defined to connect with each other like a network over and along said valleys on the current collector surface.

5. The electrode for a rechargeable lithium battery as recited in claim 1, wherein said current collector comprises a metal foil incorporating metal particles deposited on its rough surface.

6. The electrode for a rechargeable lithium battery as recited in claim 5, wherein said metal particles are deposited on projections of irregularities on the rough surface of said metal foil.

7. The electrode for a rechargeable lithium battery as recited in claim 5, wherein said metal particles are deposited by an electrolytic deposition process.

8. The electrode for a rechargeable lithium battery as recited in claim 5, wherein said metal particles are copper particles.

9. The electrode for a rechargeable lithium battery as recited in claim 5, wherein said metal foil is made of copper, nickel, stainless steel, phosphor bronze or red copper.

10. The electrode for a rechargeable lithium battery as recited in claim 1, wherein said thin film is deposited by a CVD, sputtering, vapor evaporation, spraying or plating process.

11. The electrode for a rechargeable lithium battery as recited in claim 1, wherein said thin film is a noncrystalline silicon thin film.

12. The electrode for a rechargeable lithium battery as recited in claim 1, wherein a component of said current collector is diffused into said thin film.

13. The electrode for a rechargeable lithium battery as recited in claim 12, wherein the current collector component diffused into the thin film forms a solid solution, instead of an intermetallic compound, with a component of the thin film.

14. The electrode for a rechargeable lithium battery as recited in claim 5, wherein said metal foil is made of an copper alloy and has a tensile strength of 400 N/mm$^2$ or higher, a proportional limit of 160 N/mm$^2$ or higher and an elastic coefficient of 1.1 N/mm$^2$ or higher, and that the surface of said metal foil that carries the thin film thereon has a surface roughness Ra of 0.01–1 μm.

15. The electrode for a rechargeable lithium battery as recited in claim 5, wherein said metal foil is made of a Cu—Ni—Si or Cu—Cr—Zr alloy and the surface of the metal foil that carries the thin film thereon has a surface roughness Ra of 0.01–1 μm.

16. The electrode for a rechargeable lithium battery as recited in claim 5, wherein the surface of said metal foil that carries the thin film thereon is roughened by such a technique as plating, vapor growth, etching or polishing.

17. A rechargeable lithium battery including a negative electrode comprised of the electrode as recited in claim 1, a positive electrode and a nonaqueous electrolyte.

18. A rechargeable lithium battery including a negative electrode comprised of the electrode as recited in claim 14, a positive electrode and a nonaqueous electrolyte.

19. A rechargeable lithium battery including a negative electrode comprised of the electrode as recited in claim 15, a positive electrode and a nonaqueous electrolyte.

* * * * *